United States Patent
Prior et al.

(10) Patent No.: US 8,820,763 B2
(45) Date of Patent: *Sep. 2, 2014

(54) DEVICE OF HUMAN CONVEYANCE

(75) Inventors: Gregory R. Prior, Dunedin, FL (US);
Christopher Phillip Miller, Clearwater, FL (US)

(73) Assignee: Mindworks Holdings LLC, Dunedin, FL (US)

( * ) Notice: Subject to any disclaimer, the term of this patent is extended or adjusted under 35 U.S.C. 154(b) by 477 days.

This patent is subject to a terminal disclaimer.

(21) Appl. No.: 13/156,910

(22) Filed: Jun. 9, 2011

(65) Prior Publication Data

US 2011/0233891 A1    Sep. 29, 2011

Related U.S. Application Data

(63) Continuation-in-part of application No. 12/045,201, filed on Mar. 10, 2008, now Pat. No. 7,980,578.

(60) Provisional application No. 60/918,058, filed on Mar. 15, 2007.

(51) Int. Cl.
*B62M 1/00* (2010.01)
*A63C 17/12* (2006.01)
*B62M 1/32* (2013.01)

(52) U.S. Cl.
CPC . *A63C 17/12* (2013.01); *B62M 1/32* (2013.01)
USPC .......................................................... 280/221

(58) Field of Classification Search
CPC ...... A63C 17/12; A63C 17/01; A63C 17/265; B62K 3/002; B62M 1/32
USPC ........................... 280/221, 11.28, 87.041, 254
See application file for complete search history.

(56) References Cited

U.S. PATENT DOCUMENTS

| 522,724 | A | | 9/1894 | Von Orth | |
|---|---|---|---|---|---|
| 942,333 | A | | 12/1909 | Lennox | |
| 1,072,284 | A | * | 9/1913 | Widera | 280/254 |
| 1,237,969 | A | * | 8/1917 | Stocks | 280/251 |

(Continued)

FOREIGN PATENT DOCUMENTS

| DE | 10 2004 029227 A1 | 1/2006 |
|---|---|---|
| DE | 10 2005 033829 A1 | 1/2007 |

(Continued)

*Primary Examiner* — J. Allen Shriver, II
*Assistant Examiner* — Brian Cassidy
(74) *Attorney, Agent, or Firm* — Larson & Larson, P.A.; Frank Liebenow; Justin P. Miller (57) ABSTRACT

A device for human conveyance includes front and rear wheels. The rear wheel interfaces to a sprocket/gear through a ratchet drive system allowing forward rotation of the rear wheel responsive to forward rotation of the sprocket/gear and allows free backward rotation of the sprocket/gear. The front and rear wheels are rotatably interfaced to a frame that keeps the front wheel at a constant distance from the rear wheel. A front end of an arc-shaped spring is affixed to the frame and a rear end of the arc-shaped spring has sprocket/gear teeth that are interfaced to the sprocket/gear whereas depression of the arc-shaped spring pushes the rear-end of the arc-shaped spring in a rearward direction with respect to the rear wheel and the sprocket/gear teeth turns the sprocket/gear in a forward rotational direction. A resilient member is disposed between the arc-shaped spring and the frame to absorb shock.

20 Claims, 8 Drawing Sheets

(56) References Cited

U.S. PATENT DOCUMENTS

| | | | |
|---|---|---|---|
| 2,076,804 A | 4/1937 | Winding | |
| 2,723,131 A | 7/1953 | McChesney, Jr | |
| 3,362,723 A | 1/1968 | Bretholz | |
| 3,415,540 A | 12/1968 | Portnoff | |
| 4,775,162 A | 10/1988 | Chao | |
| 5,224,724 A * | 7/1993 | Greenwood | 280/221 |
| 6,334,838 B1 | 1/2002 | Lee | |
| 6,375,208 B1 | 4/2002 | Lee | |
| 6,808,188 B1 | 10/2004 | Fan | |
| 7,044,488 B1 | 5/2006 | Hamend | |
| 7,581,742 B2 * | 9/2009 | Chiu et al. | 280/252 |
| 7,793,956 B2 | 9/2010 | Hsu | |
| 7,980,573 B1 * | 7/2011 | Naman | 280/87.041 |
| 2002/0067018 A1 * | 6/2002 | Shaw | 280/220 |
| 2002/0096848 A1 | 7/2002 | Wei et al. | |
| 2002/0158440 A1 | 10/2002 | Graf | |
| 2002/0163159 A1 | 11/2002 | Christensen et al. | |
| 2004/0178603 A1 * | 9/2004 | Yan | 280/221 |
| 2008/0088109 A1 | 4/2008 | Chiu et al. | |
| 2014/0076075 A1 * | 3/2014 | Miller | 74/55 |

FOREIGN PATENT DOCUMENTS

| | | |
|---|---|---|
| KR | 20-0306899 | 3/2003 |
| KR | 20-0345647 Y1 | 3/2004 |
| WO | 2004-056647 A1 | 7/2004 |

\* cited by examiner

DEVICE OF HUMAN CONVEYANCE

CROSS-REFERENCE TO RELATED APPLICATION

This application is a continuation of U.S. patent application Ser. No. 12/045,201, filed Mar. 10, 2008, inventors Gregory R. Prior and Christopher Phillip Miller which takes priority from U.S. provisional patent application Ser. No. 60/918,058; filed Mar. 15, 2007, the disclosure of both are hereby incorporated by reference.

FIELD OF THE INVENTION

This invention relates to a method and apparatus for allowing a person operating the device of human conveyance to propel oneself, via the device, in a controlled manner along a navigable path.

BACKGROUND OF THE INVENTION

When a person jumps in the air using muscle energy a substantial amount of potential energy has been created. An example would be appreciated by watching as the person springs and bounce higher and higher on a diving board. Similarly, a human can simply lift one foot off the ground, while maintaining support with the other foot. Thereafter, with gravity alone or with a slight amount of additional downward muscle force, the human may allow the elevated foot's weight to descend and create a comparable effect.

Humanly created potential energy is available to be converted into a substantial amount of useful kinetic energy through little additional effort, by only relying on the natural laws of gravity.

Prior devices for human conveyance relied upon this kinetic energy to be directed onto a pedal system as in a bicycle or pushed against the ground as with a scooter or skateboard. Being that it is not practical to integrate a pedal system in a scooter or a skate board because of the low clearance of the running board of such devices, a way to propel such a device using the energy of a human user is needed. A system is needed that utilizes this energy, providing useful conveyance of the human user.

SUMMARY OF THE INVENTION

In one embodiment, a device for human conveyance is disclosed including wheels rotatably interfaced to a frame such that front wheel(s) are held at a constant distance from rear wheel(s). A device is provided for creating a rearward movement from a downward movement and another device is provided for converting the rearward movement into a rotational movement of the rear wheel. A resilient member is disposed between the device for creating a rearward movement from a downward movement and the frame for absorbing shock.

In another embodiment, a device for human conveyance is disclosed including wheels. One or more rear wheels are interfaced to a sprocket/gear through a ratchet drive system which allows forward rotation of the rear wheel(s) in response to forward rotation of the sprocket/gear and allows free backward rotation of the sprocket/gear. A frame interfaces the front wheel(s) to the rear wheel(s) keeping the front wheel(s) at a constant distance from the rear wheel(s). The front and rear wheels are rotatably interfaced to the frame. A front end of an arc-shaped spring is affixed to the frame in proximity to the front wheel(s) and a rear end of the arc-shaped spring has sprocket/gear teeth interfaced to the sprocket/gear whereas depression of the arc-shaped spring pushes the rear-end of the arc-shaped spring in a rearward direction with respect to the rear wheel(s) and the sprocket/gear teeth turns the sprocket/gear in a forward rotational direction. A resilient member is disposed between the arc-shaped spring and the frame for absorbing shock.

In another embodiment, a method of human conveyance is disclosed including providing a device for human conveyance that has a front wheel and a rear wheel. The rear wheel is interfaced to a sprocket/gear through a ratchet drive system and the ratchet drive system allows forward rotation of the rear wheel in response to forward rotation of the sprocket/gear and free backward rotation of the sprocket/gear. A frame interfaces the front wheel to the rear wheel keeping the front wheel at a constant distance from the rear wheel. The front wheel and the rear wheel are rotatably interfaced to the frame. A front end of an arc-shaped spring is affixed to the frame in proximity to the front wheel while a rear end of the arc-shaped spring has sprocket/gear teeth that are interfaced to the sprocket/gear. Depressing the arc-shaped spring pushes the rear-end of the arc-shaped spring in a rearward direction with respect to the rear wheel resulting in the sprocket/gear teeth turning the sprocket/gear in a forward rotational direction. The method continues with a user pushing down on the arc-shaped spring causing the rear end of the arc-shaped spring to turn the sprocket/gear and, therefore, turning the rear wheel causing the device for human conveyance to move in a forward direction. Next, the user lifts up on the arc-shaped spring, thereby returning the rear end of the arc-shaped spring. The prior two steps are repeated until the device for human conveyance reaches a point of destination.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Reference will now be made in detail to the presently preferred embodiments of the invention, examples of which are illustrated in the accompanying drawings. Throughout the following detailed description, the same reference numerals refer to the same elements in all figures.

Figure 1:
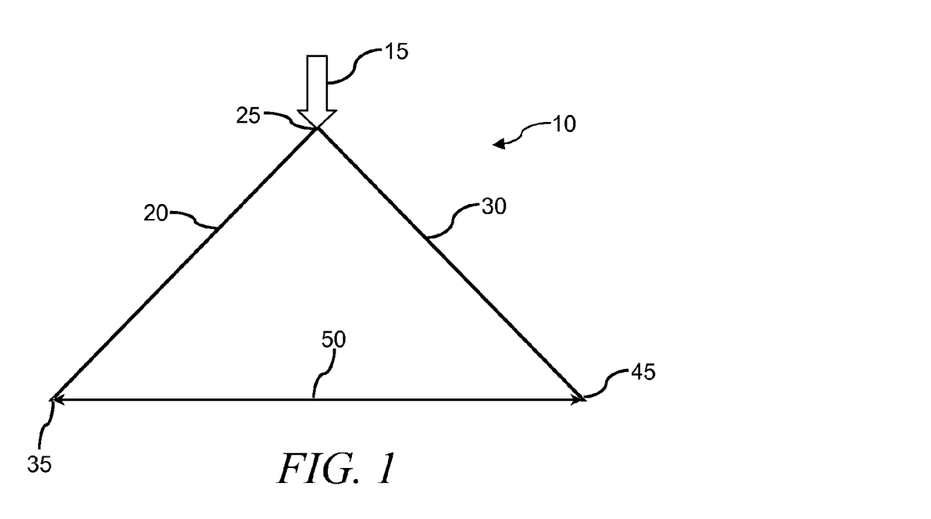
FIG. 1 illustrates an operational schematic view of the present invention.
Figure 2:
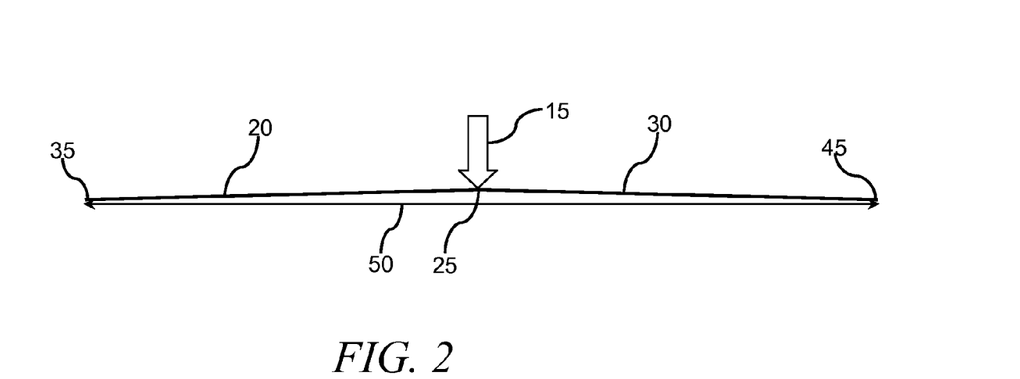
FIG. 2 illustrates a second operational schematic view of the present invention.

Referring to FIGS. 1 and 2, an operational schematic view of a system is shown. The present invention translates simple body motions 15 into a useful force that may then be used to efficiently rotate a wheel. The present invention is directed to a vehicle composed of a semi flexible or rigid chassis supported by one or more wheels placed in both the forward and rear of the vehicle. Outwardly, an embodiment of a configuration of this invention could be described as resembling a bicycle, a scooter, or even a skateboard.

This embodiment is directed to a means of propulsion of the inventive device and provides a flexible or hinged platform which securely attaches to a chassis at one end and converts a human's self-generated up and down energy into a rotational energy, which can efficiently rotate a wheel of the device.

A unidirectional drive mechanism is activated by either a flexible or hinged platform that maintains an angled configuration while at rest. The platform assumes a more linear profile as it is deformed or flattened by the rider's weight.

In FIG. 1, the sides 20/30 of the triangle 10 are shown with equivalent lengths as the hypotenuse 50. It should be noted that in an embodiment, the hypotenuse 50 of the triangle virtually exists. Changes in dimension between a first vertex 35 and a second vertex 45 occur as a result of a force 15 applied to the third vertex 25. The change in dimension is represented by a distance 50 between the first vertex 35 and the second vertex 45. Since the sides 20/30 of the triangle are of fixed length, as pressure 15 is applied to the third vertex 25, the sides 20/30 are flattened as shown in FIG. 2. The result in the downward force 15 is transposed into a linear force making the distance 50 between the first and second vertices 35/45 approach the total of the length of the sides 20/30. In operation, a spring (not shown) is positioned to pull the first and second vertices 35/45 together, thereby returning the triangle 10 to its original shape after the force 15 is diminished. It should also be noted that a stop is needed, preventing the sides 20/30 from becoming a straight line; is such was allowed, the spring is prevented from returning the triangle 10 to its original shape.

Figure 3:
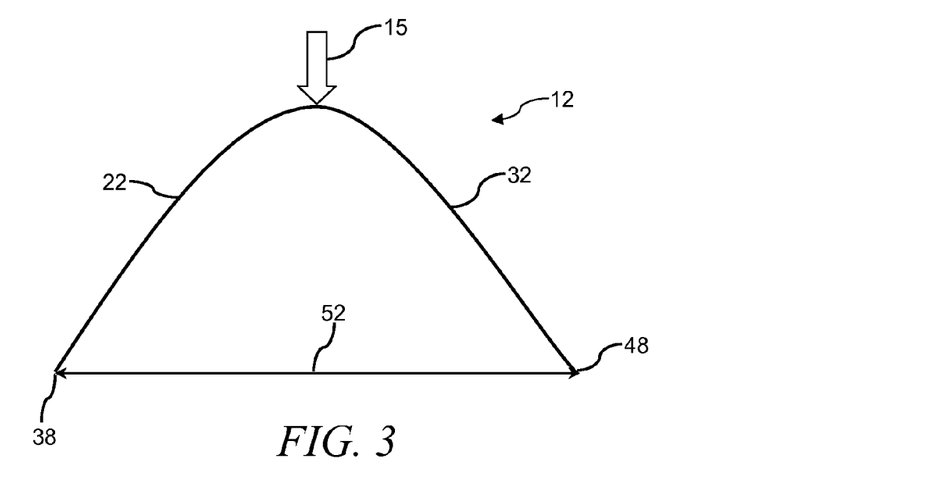
FIG. 3 illustrates a third operational schematic view of the present invention.
Figure 4:
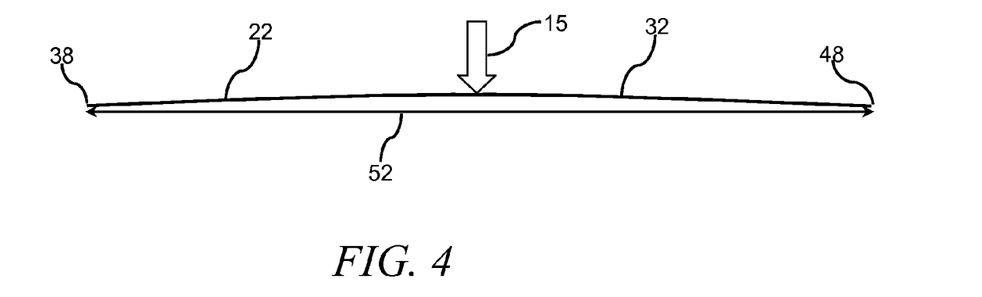
FIG. 4 illustrates a fourth operational schematic view of the present invention.

Referring to FIGS. 3 and 4, an operational schematic view of a system is shown. This embodiment translates simple body motions 15 into a useful force that may then be used to efficiently rotate a wheel.

In FIG. 3, an arc 22/32 is shown. In this example, each half of the arc 22/32 are shown of equal size and shape, although this is not required. The distance 52 between the end points of the arc 38/48 is shown. Changes in dimension between end points 38/48 of the arc 22/32 occur as a result of a force 15 applied to the arc 22/32. The change in dimension is represented by a distance 52 between end points 38/48 of the arc 22/32. Since the halves 22/32 of the arc are of fixed length, as pressure 15 is applied to the arc 22/32, the side halves 22/32 of the arc 22/32 are flattened as shown in FIG. 4. The result in the downward force 15 is transposed into a linear force making the distance 50 between the end points 38/48 of the arc 22/32 become longer.

Figure 5:
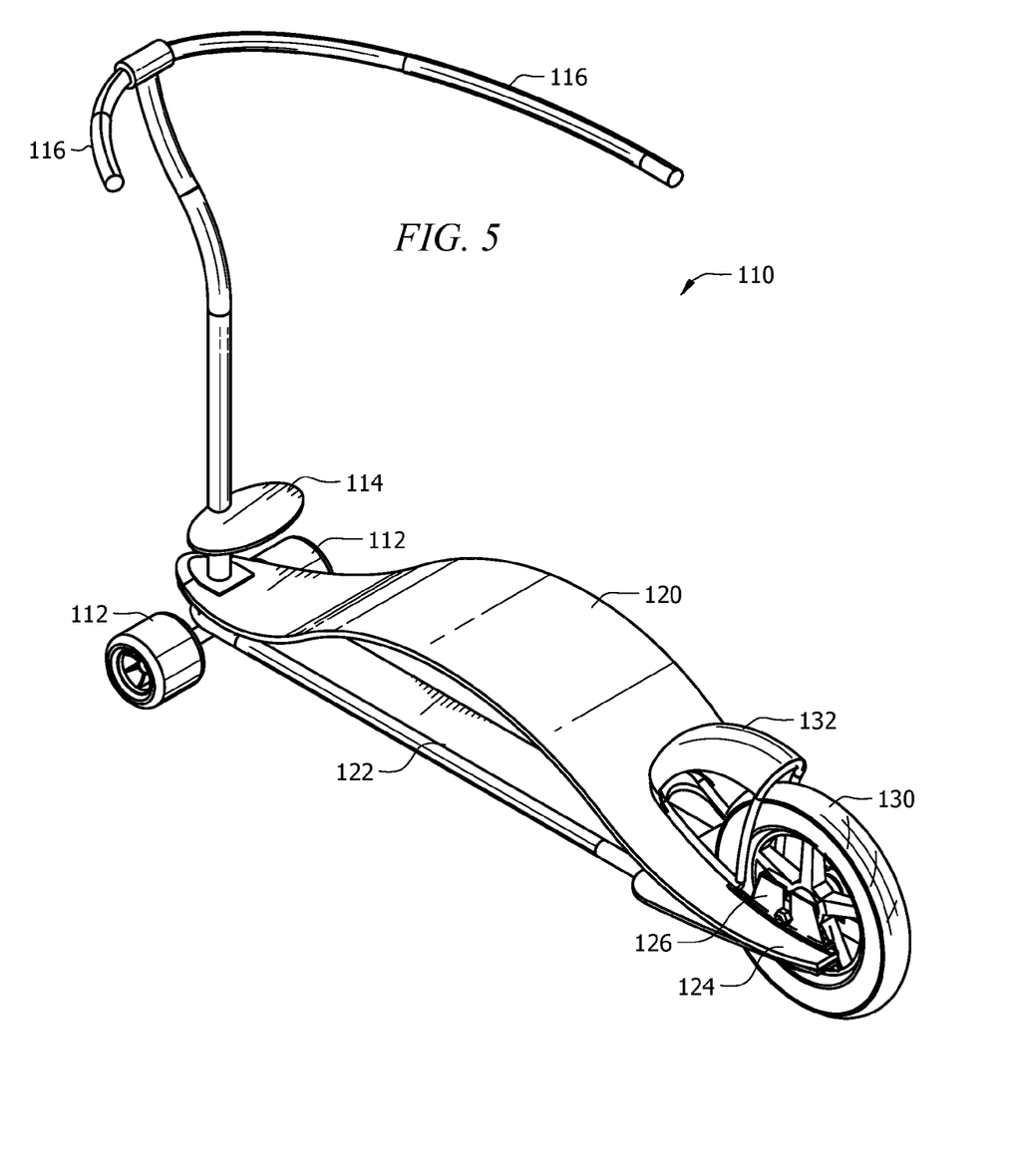
FIG. 5 illustrates an isometric view of the present invention.

Referring to FIG. 5, an isometric view of the device for human conveyance 110 is shown. Although the device for human conveyance 110 is shown as a scooter, the present invention includes any device for human conveyance, including a scooter, a skateboard, etc. Also, although shown having two front wheels 112 and one back wheel 130, any configuration of wheels is anticipated, including one front wheel and one back wheel.

In some embodiments, the scooter 110 has handle bars 116 interfaced with the front wheels 112 for steering the scooter. In some embodiments, a foot rest 114 is provided to allow the user to rest a foot upon while using the other foot for propelling the device for human conveyance 110 as will be discussed.

Figure 12:
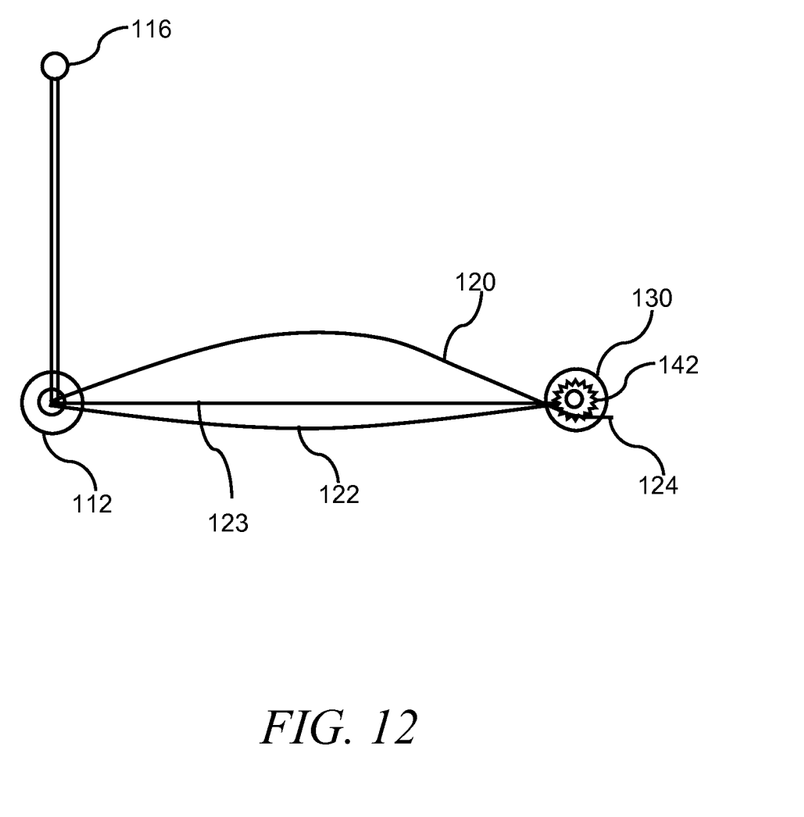
FIG. 12 illustrates a schematic view of a modified chassis.

The front wheel(s) 112 are coupled to the rear wheel(s) 130 by a frame member 122. The frame member 122 keeps the front wheel(s) 112 at a constant distance from the rear wheel(s) 130. In the preferred embodiment, the frame member 122 is semi-rigid, providing some flexibility to absorb the shock of the propulsion mechanism. In other words, the frame 122 bends slightly, preferably at a mid-section, when downward pressure is applied. In some embodiments, the frame member 122 is rigid. In some embodiments (as shown in FIG. 12), the frame member 122 is rigid (e.g. made of a material such as steel) and a resilient intermediate frame member 123 (see FIG. 12) is disposed between the arc-shaped drive spring 120 and the frame member 122 (rigid or semi-rigid frame member 122). In such, the resilient intermediate frame member 123 absorbs some of the shock when the arc-shaped drive spring 120 is deformed by downward pressure and the resilient intermediate frame member 123 helps push the arc-shaped drive spring 120 back into position after the downward pressure abates readying for the next downward pressure.

In the example of FIG. 5, the rear wheel 130 is rotatably attached to the frame member 122 by a frame member plate 126. In some embodiments, a rear wheel guard 132 is provided to reduce the risk of a user rubbing their shoe against the rear wheel(s) 130 while using the scooter 110.

In this example, the drive mechanism consists of an arc-shaped drive spring 120 that has a rear-wheel interface 124. The rear wheel interface 124 will be described later. The drive mechanism operates based upon the principles previously described, in that, when the user presses down on the drive spring 120, the rear wheel interface is pushed in a generally horizontal rearward direction, thereby interfacing with the rear wheel 130 (as will be described), causing the scooter 110 to move in a forward direction. In its simplest form, the interface to the rear wheel 130 is a friction interface, in that the rear-wheel interface 124 rubs against a hub (not shown), causing the hub to turn the rear wheel 130 in a forward direction. So that the rear wheel 130 does not stop or reverse when the rear-wheel interface 124 retracts (e.g., the use lifts up), a ratchet mechanism as known in the industry is provided to allow the rear wheel to continue to turn in a forward direction while the rear-wheel interface 124 retracts.

Figure 6:
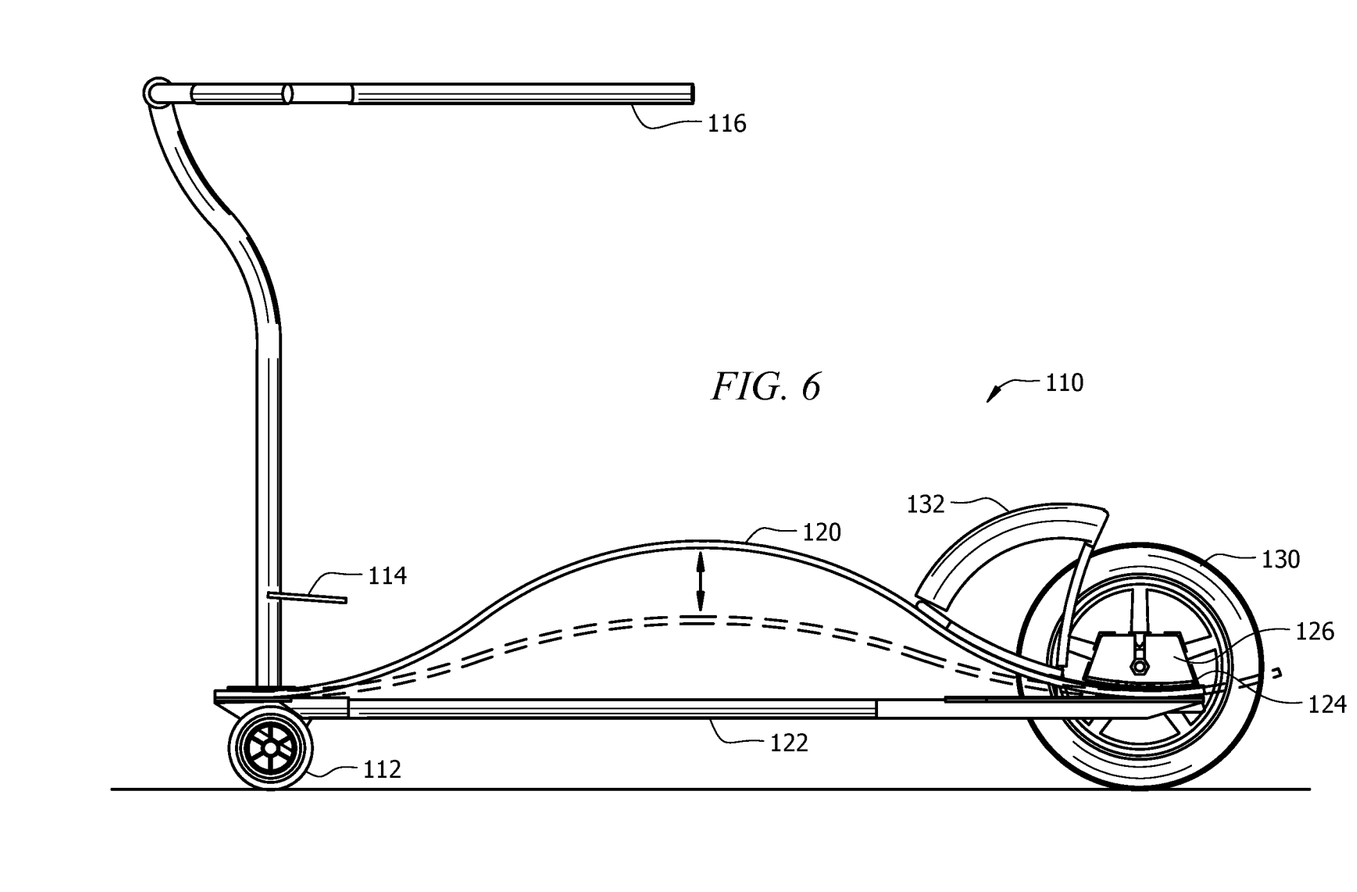
FIG. 6 illustrates a plan view of the present invention showing the drive spring in its relaxed mode and depressed mode.

Referring to FIG. 6, a plan view of the device for human conveyance 110 showing the drive spring in its relaxed mode and depressed mode is shown. Again, a device for human conveyance 110 is shown as a scooter with a front wheel 112 and a rear wheel 130.

In this example, the scooter 110 has handle bars 116 interfaced with the front wheels 112 for steering the scooter. In some embodiments, a foot rest 114 is provided to allow the user to rest a foot upon while using the other foot for propelling the device for human conveyance 110 as will be discussed.

The front wheel(s) 112 are coupled to the rear wheel(s) 130 by a frame member 122. The frame member 122 keeps the front wheel(s) 112 at a constant distance from the rear wheel(s) 130. In this embodiment, the rear wheel 130 is rotatably attached to the frame member 122 by a frame member plate 126. In some embodiments, a rear wheel guard 132 is provided to reduce the risk of a user rubbing their shoe against the rear wheel(s) 130 while using the scooter 110. In the preferred embodiment, the frame member 122 is semi-rigid, providing some flexibility to absorb the shock of the propulsion mechanism. In other embodiments, the frame member 122 is rigid.

The drive mechanism arc-shaped drive spring 120 is shown in its relaxed position (e.g., the user has not applied pressure with a foot) and in its compressed position (shown in dashed lines). As can be seen, the tail end of the drive spring 124 extends rearward past the rear wheel drive mechanism as the drive spring 120 is compressed.

Figure 7:
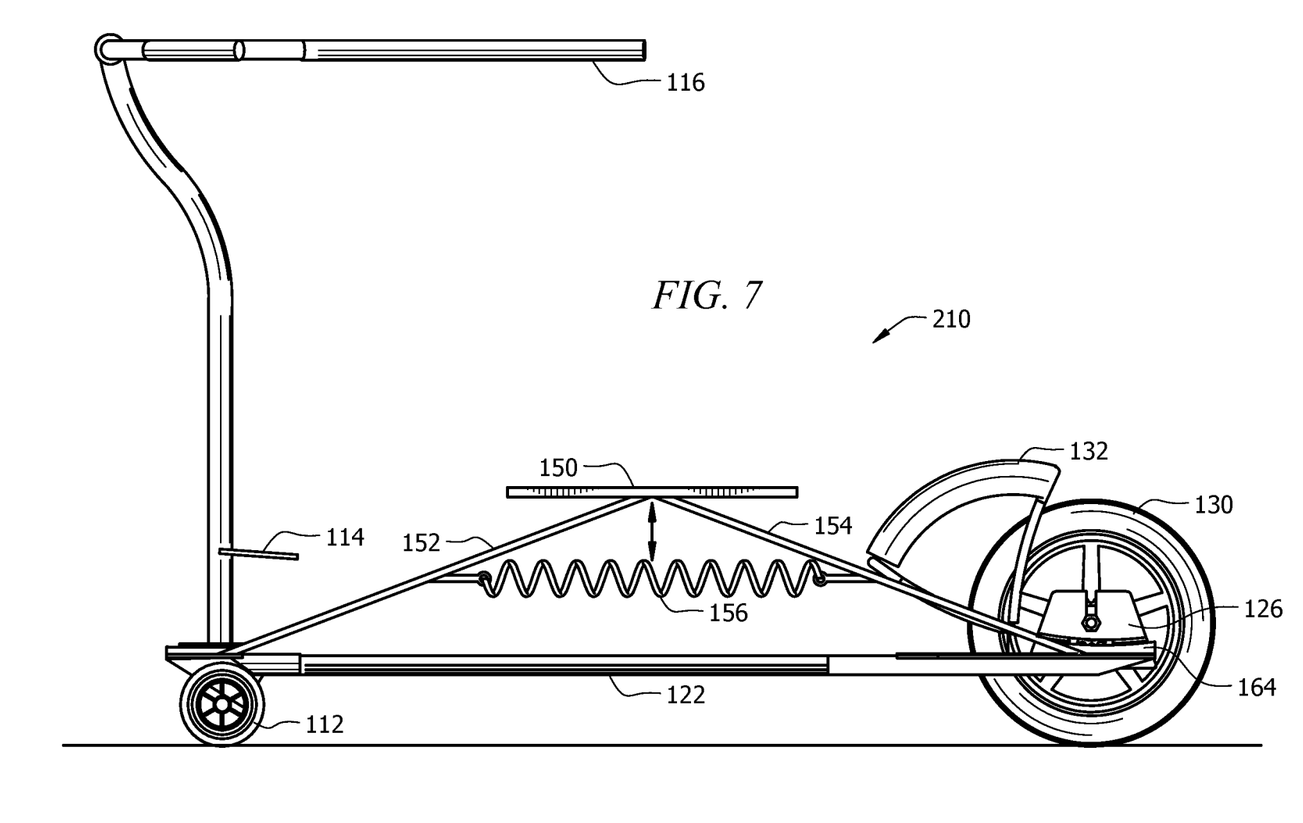
FIG. 7 illustrates a plan view of the present invention showing an alternative drive mechanism.

Referring to FIG. 7, a plan view of the device for human conveyance 210 showing an alternative drive mechanism is shown. Again, a device for human conveyance 210 is shown as a scooter with a front wheel 112 and a rear wheel 130.

In some embodiments, the scooter 210 has handle bars 116 interfaced with the front wheels 112 for steering the scooter. In some embodiments, a foot rest 114 is provided to allow the user to rest a foot upon while using the other foot for propelling the device for human conveyance 210 as will be discussed.

The front wheel(s) 112 are coupled to the rear wheel(s) 130 by a frame member 122. The frame member 122 keeps the front wheel(s) 112 at a constant distance from the rear wheel(s) 130. In this embodiment, the rear wheel 130 is rotatably attached to the frame member 122 by a frame member plate 126. In some embodiments, a rear wheel guard 132 is provided to reduce the risk of a user rubbing their shoe against the rear wheel(s) 130 while using the scooter 210.

In this embodiment, the drive mechanism angle-shaped drive 152/154 is shown in its relaxed position (e.g., the user has not applied pressure with a foot) As can be seen, the tail end 164 of the angle-shaped drive 152/154 will extend rearward past the rear wheel drive mechanism as the angle-shaped drive 152/154 is compressed (e.g., by a user's foot). To return the angle-shaped drive 152/154 to its original position after the user lifts their foot, a spring 156 is employed. Other spring configurations are anticipated as known in the art. In some embodiments, a foot platform 150 is attached to the angle-shaped drive 152/154, providing greater comfort to the user's foot as the user steps down on the angle-shaped drive 152/154.

Figure 8:
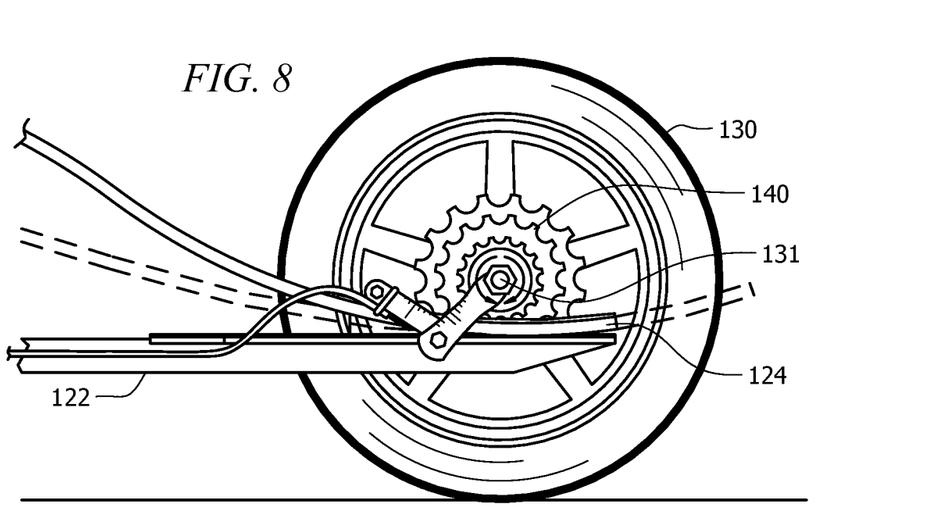
FIG. 8 illustrates an enlarged plan view of a first gear system of the present invention.

Referring to FIG. 8, an enlarged plan view of a first gear system of the device for human conveyance is shown. In this example, the tail end 124 of the arc-shaped drive spring 120 is shown interfacing with a multiple-speed sprocket system 140 interfaced to the rear wheel 130 by a drive shaft 131. As the tail end 124 of the arc-shaped drive spring 120 moves in the rearward direction, it turns a selected one of the sprockets 140. If the smaller sprocket of the sprockets 140 is selected, the scooter will go faster whereas if a larger sprocket of the sprockets 140 is selected, the scooter will go slower but will be able to climb a steeper grade as known in the industry. The sprockets 140 are interfaced to the rear wheel 130 by a ratchet mechanism (not shown internal to the hub of the wheel 130) as known in the industry, providing forward motion as the tail end 124 of the arc-shaped drive spring 120 moves in a rearward direction with respect to the rear wheel and allows the wheel 130 to roll freely in the forward motion as the tail end 124 of the arc-shaped drive spring 120 moves in a forward direction with respect to the rear wheel 130.

Figure 9:
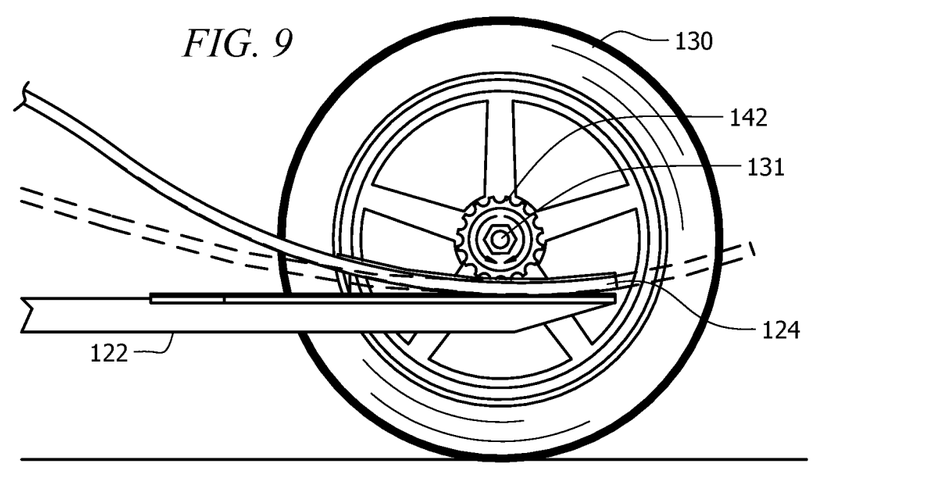
FIG. 9 illustrates an enlarged plan view of a second gear system of the present invention.

Referring to FIG. 9, an enlarged plan view of a second gear system of the device for human conveyance is shown. In this example, the tail end 124 of the arc-shaped drive spring 120 is shown interfacing with a single sprocket 142 interfaced to the rear wheel 130 by a drive shaft 131. As the tail end 124 of the arc-shaped drive spring 120 moves in the rearward direction with respect to the rear wheel 130, it turns the sprocket 142. The sprocket 142 is interfaced to the rear wheel 130 by a ratchet mechanism (not shown) as known in the industry, providing forward motion as the tail end 124 of the arc-shaped drive spring 120 moves in a rearward direction with respect to the rear wheel and allows the wheel 130 to roll freely in the forward motion as the tail end 124 of the arc-shaped drive spring 120 moves in a forward direction with respect to the rear wheel 130.

Figure 10:
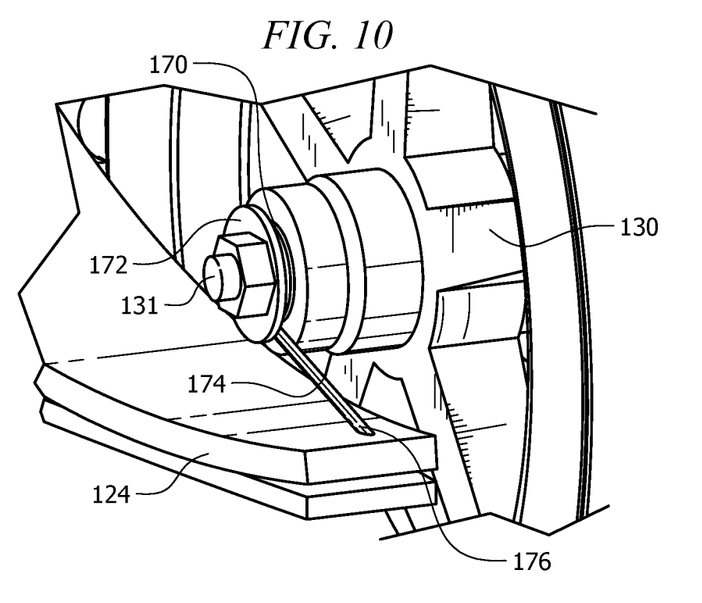
FIG. 10 illustrates an enlarged plan view of a spool system of the present invention.

Referring to FIG. 10, an enlarged plan view of a spool system of the device for human conveyance is shown. In this embodiment, the tail end 124 of the arc-shaped drive spring 120 is interfaced to a spool 170/172 by a cable 174. In this example, the spool shares a hub 131 of the rear wheel 130.

The cable 174 is attached to the tail end 124 of the arc-shaped drive spring 120 at an end 176. As the tail end 124 of the arc-shaped drive spring 120 moves in the rearward direction with respect to the rear wheel 130, it pulls the cable 174 which is wound around the spool 170/172. This unwinding operation causes the rear wheel 130 to turn in a forward direction. The spool 170/172 is interfaced to the rear wheel 130 by a ratchet mechanism (not shown) as known in the industry, providing forward motion as the tail end 124 of the arc-shaped drive spring 120 moves in a rearward direction with respect to the rear wheel and allows the wheel 130 to roll freely in the forward motion as the tail end 124 of the arc-shaped drive spring 120 moves in a forward direction with respect to the rear wheel 130. Additionally, the spool 170/172 is spring-loaded to rewind the cable 174 around the spool 170/172 as the tail end 124 of the arc-shaped drive spring 120 moves in the forward direction.

Figure 11:
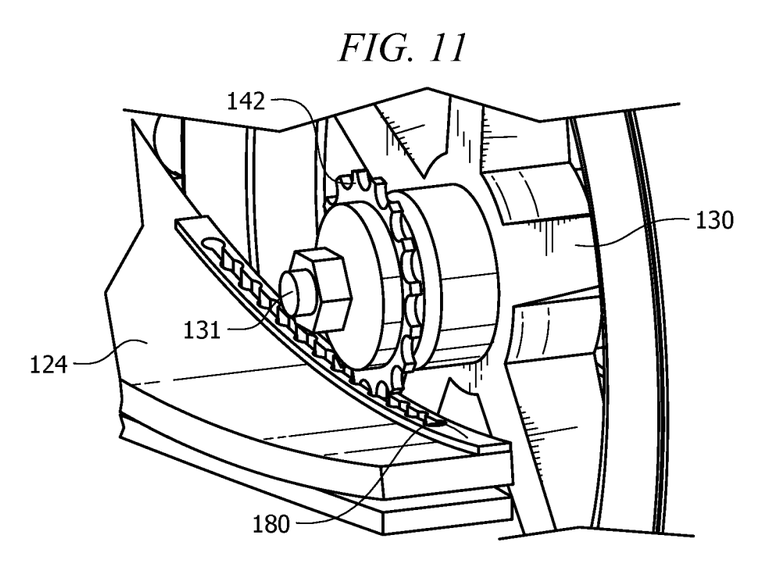
FIG. 11 illustrates an enlarged plan view of a third gear system of the present invention.

Referring to FIG. 11, an enlarged plan view of the gear system of the device for human conveyance is shown. In this example, a sprocket interface gear 180 is affixed to the tail end 124 of the arc-shaped drive spring 120. The teeth of the sprocket 142 mesh with the sprocket interface gear 180 so that as the tail end 124 of the arc-shaped drive spring 120 and sprocket interface gear 180 move in the rearward direction with respect to the rear wheel 130, the sprocket 142 turns the wheel 130 in a forward direction. The sprocket 142 is interfaced to the rear wheel 130 by a ratchet mechanism (not shown) as known in the industry, providing forward motion as the tail end 124 of the arc-shaped drive spring 120 moves in a rearward direction with respect to the rear wheel and allows the wheel 130 to roll freely in the forward motion as the tail end 124 of the arc-shaped drive spring 120 moves in a forward direction with respect to the rear wheel 130.

Note that a sprocket interface 180/142 is described as an example and any other type of gear interface known in the industry is anticipated and is interchangeable with the described sprocket 142—sprocket interface gear 180 system.

Referring to FIG. 12, a schematic view of a modified chassis is shown. In some embodiments a resilient intermediate frame member 123 is disposed between the arc-shaped drive spring 120 and the frame member 122 (rigid or semi-rigid frame member 122). In such, the resilient intermediate frame member 123 absorbs some of the shock when the arc-shaped drive spring 120 is deformed by downward pressure and the resilient intermediate frame member 123 helps push the arc-shaped drive spring 120 back into position after the downward pressure abates readying for the next downward pressure. It is anticipated that the resilient, intermediate frame member 123 be made of any known resilient material such as rubber, spring plastic, spring steel, etc.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A device for human conveyance comprising:
a front wheel;
a rear wheel;
a frame member interfacing the front wheel to the rear wheel whereas the front wheel is held at a constant distance from the rear wheel and whereas the front wheel and the rear wheel are rotatably interfaced to the frame member;
a resilient platform, a forward edge of the resilient platform interfaced to the frame member in proximity to the front wheel, whereas downward pressure on the resilient platform creates an increase in a distance between the forward edge of the resilient platform and a distal rearward edge of the resilient platform;
a resilient frame member situated between the means for creating a rearward movement from a downward movement and the frame member, the resilient frame member absorbing shock from a downward movement of the means for creating rearward movement; and
a means for converting the increase in the distance between the forward edge of the resilient platform and a distal rearward edge of the resilient platform into a rotational movement of the rear wheel.

2. The device for human conveyance of claim 1, wherein the resilient platform comprises an arc-shaped spring, a first end of the arc-shaped spring is held stationary with respect to the frame member, whereas the downward movement depresses the arc-shaped spring, thereby pushing a distal second end of the arc-shaped spring in a direction distal from the first end of the arc-shaped spring.

3. The device for human conveyance of claim 2, wherein the second end of the arc-shaped spring is interfaced to turn one of the wheels through a sprocket system and a ratchet system.

4. The device for human conveyance of claim 3, wherein the sprocket system has multiple, selectable sprockets.

5. The device for human conveyance of claim 2, wherein the second end of the arc-shaped spring is interfaced to turn one of the wheels through a spool and cable system and a ratchet system.

6. The device for human conveyance of claim 1, wherein resilient platform comprises an angled-shaped drive having a spring affixed to each side of the angle-shaped drive, a first end of the angled-shaped drive is held stationary with respect to the frame member, whereas the downward movement depresses the angled-shaped drive, thereby pushing an end of the angled-shaped drive that is distal to the first end of the angled-shaped drive towards the rear wheel.

7. The device for human conveyance of claim 6, wherein the second end of the angled-shaped drive is interfaced to turn one of the wheels through a sprocket system and a ratchet system.

8. The device for human conveyance of claim 7, wherein the sprocket system has multiple, selectable sprocket gears.

9. The device for human conveyance of claim 6, wherein the second end of the angle-shaped drive is interfaced to turn one of the wheels through a spool and cable system and, in turn through a ratchet system.

10. The device for human conveyance of claim 1, wherein the frame member is semi-rigid.

11. A device for human conveyance comprising:
a front wheel;
a rear wheel, the rear wheel interfaced to a gear through a ratchet drive system, the ratchet drive system allowing forward rotation of the rear wheel in response to forward rotation of the gear and the ratchet drive system allowing free backward rotation of the gear;
a frame interfacing the front wheel to the rear wheel whereas the front wheel is held at a constant distance from the rear wheel and whereas the front wheel and the rear wheel are rotatably interfaced to the frame;
an arc-shaped spring, a front end of the arc-shaped spring affixed to the frame in proximity to the front wheel, a rear end of the arc-shaped spring having a gear interfaced to the sprocket whereas depression of the arc-shaped spring pushes the rear-end of the arc-shaped spring in a rearward direction with respect to the rear wheel and the sprocket gear turns the sprocket in a forward rotational direction; and
a resilient intermediate frame member disposed between the frame and the arc-shaped spring.

12. The device for human conveyance of claim 11, wherein the device for human conveyance is a scooter.

13. The device for human conveyance of claim 12, further comprising a handle system interfaced with the front wheel for steering the device for human conveyance.

14. The device for human conveyance of claim 13, further comprising a foot rest interfaced with the handle system for placing of a user's foot.

15. The device for human conveyance of claim 11, wherein the frame is semi-rigid.

16. A method of human conveyance, the method comprising:
(a) providing a device for human conveyance, the device for human conveyance comprising:
a front wheel;
a rear wheel, the rear wheel interfaced to a gear through a ratchet drive system, the ratchet drive system allowing forward rotation of the rear wheel in response to forward rotation of the gear and the ratchet drive system allowing free backward rotation of the gear;
a frame interfacing the front wheel to the rear wheel whereas the front wheel is held at a constant distance from the rear wheel and whereas the front wheel and the rear wheel are rotatably interfaced to the frame;
an arc-shaped spring, a front end of the arc-shaped spring affixed to the frame in proximity to the front wheel, a rear end of the arc-shaped spring having gear teeth interfaced to the gear whereas depression of the arc-shaped spring pushes the rear-end of the arc-shaped spring in a rearward direction with respect to the rear wheel and the gear teeth turns the gear in a forward rotational direction;
(b) pushing down on the arc-shaped spring, thereby causing the rear end of the arc-shaped spring to turn the gear and therefore the gear turns the rear wheel causing the device for human conveyance to move in a forward direction;
(c) lifting up on the arc-shaped spring, thereby returning the rear end of the arc-shaped spring; and
(d) repeating steps b and c until the device for human conveyance reaches a point of destination.

17. The method of claim 16, wherein the device for human conveyance is a scooter.

18. The method of claim 17, further comprising a handle system interfaced with the front wheel and steering the device for human conveyance using the handle system.

19. The method of claim 18, further comprising a foot rest interfaced with the handle system and placing a user's foot.

20. The method of claim 16, wherein the frame is rigid and an intermediate resilient member is disposed between the frame and the arc-shaped spring, whereas in the step (b), after pushing down on the arc-shaped spring, the arc-shaped spring contacts the intermediate resilient member and the intermediate resilient member absorbs shock from the arc-shaped spring.

* * * * *